United States Patent
Browne et al.

(10) Patent No.: US 7,655,170 B2
(45) Date of Patent: Feb. 2, 2010

(54) ADJUSTABLE SHIMS AND WASHERS

(75) Inventors: Alan L. Browne, Grosse Pointe, MI (US); John A. Cafeo, Farmington, MI (US); Nancy L. Johnson, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 789 days.

(21) Appl. No.: 11/147,658

(22) Filed: Jun. 8, 2005

(65) Prior Publication Data

US 2005/0272211 A1 Dec. 8, 2005

Related U.S. Application Data

(60) Provisional application No. 60/577,984, filed on Jun. 8, 2004.

(51) Int. Cl.
*B29C 51/00* (2006.01)
(52) U.S. Cl. .......................... 264/322; 264/320; 264/345
(58) Field of Classification Search ........................ None
See application file for complete search history.

(56) References Cited

U.S. PATENT DOCUMENTS

| | | | |
|---|---|---|---|
| 6,156,842 A | 12/2000 | Hoenig et al. |
| 6,388,043 B1 | 5/2002 | Langer et al. |
| 6,720,402 B2 | 4/2004 | Langer et al. |
| 6,858,680 B2 | 2/2005 | Gunatillake et al. |

*Primary Examiner*—Monica A Huson

(57) ABSTRACT

A method comprising disposing an active device comprising a shape memory polymer upon a first surface; wherein the active device is operative to change at least one physical attribute in response to a thermal activation signal; activating the active device with a thermal activation signal to substantially decrease its modulus, contacting and compressing the active device with a second surface, and cooling the device to set a compressed geometry. In another embodiment, a method comprising disposing an active device comprising a shape memory polymer in a gap between two opposing surfaces; wherein the active device is operative to exhibit a memorized shape in response to a thermal activation signal; activating the active device with a thermal activation signal to increase a dimension of the active device; filling the gap between the opposing surfaces, and cooling the device to set a new gap filling dimension.

15 Claims, 1 Drawing Sheet

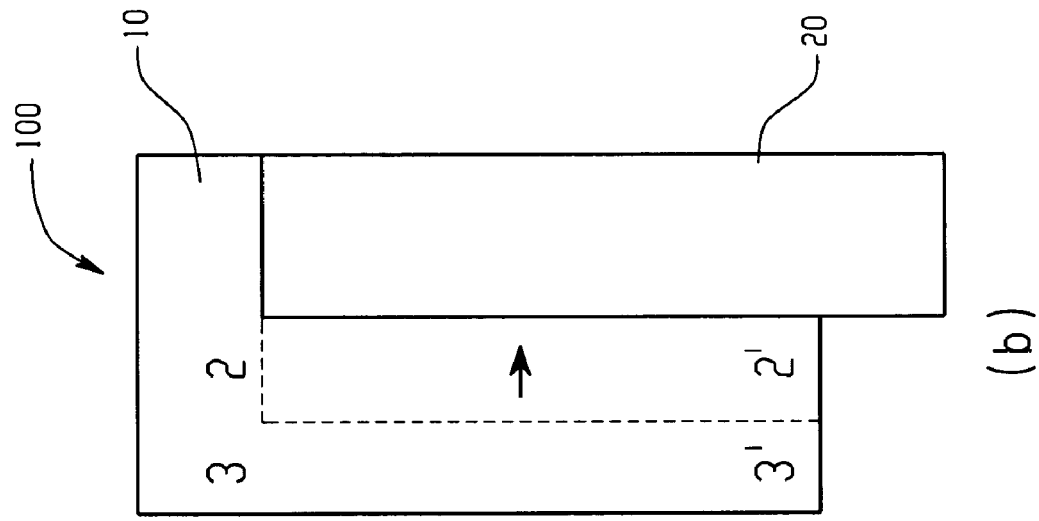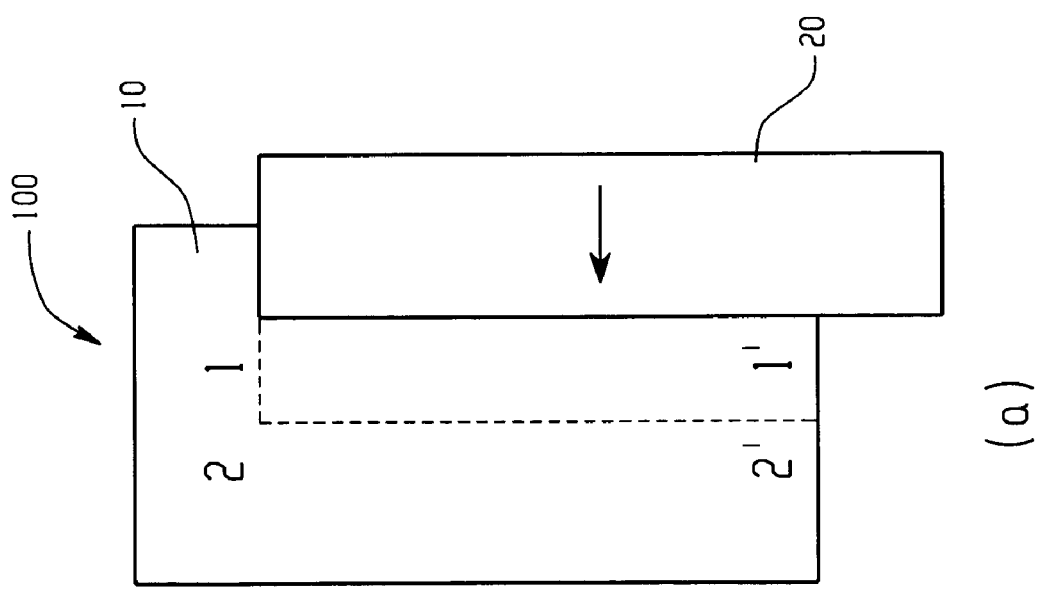
Figure

ADJUSTABLE SHIMS AND WASHERS

CROSS-REFERENCE TO RELATED APPLICATIONS

This application claims the benefit of U.S. Provisional Application Ser. No. 60/577,984 filed Jun. 8, 2004, the entire contents of which are hereby incorporated by reference.

BACKGROUND

This disclosure relates to adjustable shims, washers, seals, grommets, spacers, gaskets and the like, for use in devices such as machinery and automobiles that are assembled from multiple parts, wherein the parts are to be kept at fixed spacings, or maintained in relative alignments and/or positions with respect to one another.

With the passage of time, the various parts of a machine or a vehicle can start to become loose due to vibration. In addition to potentially negatively affecting machine/vehicle performance, this often results in chattering and other undesirable noises. In addition, with the passage of time, adjacent surfaces that are designed to be flush with one another can become misaligned. Misaligned surfaces are often aesthetically unpleasing. These changes in performance and increases in vibration and/or misalignment are generally brought about by seals and/or washers that are under elongational, compressive or shear stresses and which undergo deformation (i.e., a permanent set) with the passage of time. A permanent set occurs when the seal and/or washer begins to undergo plastic deformation. In order to reduce or correct this vibration and/or mis-alignment, it is often desirable to replace the seals, washers, springs, or the like, with new components. Such replacements are expensive, time consuming and occasionally tedious. It is therefore desirable to correct for such permanent sets by means that do not involve replacement of the washers, seals, springs, or the like.

SUMMARY

Disclosed herein is a method comprising disposing an active device comprising a shape memory polymer upon a first surface; wherein the active device is operative to change at least one physical attribute in response to a thermal activation signal; activating the active device with a thermal activation signal to substantially decrease its modulus, contacting and compressing the active device with a second surface, and then cooling the device to set a compressed geometry.

Disclosed herein too is a method comprising disposing an active device comprising a shape memory polymer in a gap between opposing surfaces; wherein the active device is operative to exhibit a memorized shape in response to a thermal activation signal; activating the active device with a thermal activation signal to increase a dimension of the active device; filling the gap between the opposing surfaces, and cooling the device to set a new gap filling dimension.

Disclosed herein is a method of adjusting an active device disposed between two opposing surfaces comprising heating the active device comprising a shape memory polymer to a first temperature; compressing the active device between the two opposing surfaces to a first dimension; cooling the active device to a second temperature; wherein the glass transition temperature of at least one polymeric component of the shape memory polymer is between the first temperature and the second temperature; reheating the active device to the first temperature at a later point in time in so doing causing the active device to expand so as to fill any gap then existing between the opposing surfaces; and cooling the active device to the second temperature to fix this new gap-filling dimension.

Disclosed herein too is a method of adjusting an active device disposed between two opposing surfaces comprising heating the active device comprising a shape memory polymer to a first temperature; expanding the active device so as to fill any gap between the two opposing surfaces to a first dimension; cooling the active device to a second temperature; wherein the glass transition temperature of at least one polymeric component of the shape memory polymer is between the first temperature and the second temperature; reheating the active device to the first temperature at a later point in time; realigning and/or repositioning the opposing surfaces and cooling the active device to the second temperature to set the new gap filling dimension.

DESCRIPTION OF THE FIGURES

The FIGURE depicts one exemplary embodiment of the use of a shape memory polymer in a door seal.

DETAILED DESCRIPTION OF EMBODIMENTS

It is to be noted that as used herein, the terms "first," "second," and the like do not denote any order or importance, but rather are used to distinguish one element from another, and the terms "the", "a" and "an" do not denote a limitation of quantity, but rather denote the presence of at least one of the referenced item. Furthermore, all ranges disclosed herein are inclusive of the endpoints and independently combinable.

Disclosed herein are active devices that can be used to reversibly fix the relative positions, spacings, and alignments of machine components, automotive parts, surfaces of buildings, or the like. The active devices are manufactured from shape memory polymers and are adjustable prior to, during and after installation, and can be adjusted by using an external stimulus. The external stimulus is generally a change in the temperature of the device brought about by changing the surrounding temperature. The temperature of the device may also be changed by changing its internal temperature without changing the surrounding temperature. This is generally accomplished by the use of electrical fields, electrical currents, ultrasonic vibration, radiation, or the like.

In one embodiment, the method comprises disposing an active device comprising a shape memory polymer upon a first surface; wherein the active device is operative to change at least one physical attribute in response to a thermal activation signal; activating the active device with a thermal activation signal to substantially decrease its modulus, contacting and compressing the active device with a second surface, and then cooling the device to set the compressed geometry. In another embodiment, the method comprises disposing an active device comprising a shape memory polymer in a gap between opposing surfaces; wherein the active device is operative to exhibit a memorized shape in response to a thermal activation signal; activating the active device with a thermal activation signal to increase a dimension of the active device; filling the gap between the opposing surfaces, and cooling the device to set a new gap filling dimension. In one embodiment, the first surface and the second surface can both move with respect to one another. In another embodiment, either the first surface is fixed, while the second surface is movable with respect to the first surface or vice versa.

The active devices are washers, seals, springs, spacers, grommets, or the like, that are generally used to reduce vibration, increase damping or to maintain two adjacent surfaces in desired alignment. The active devices are fully reversible thermally expandable and/or contractible and are shape adjustable. The active devices are generally compressively disposed between two opposing surfaces of the components of an assembly. In one embodiment, the devices are compressed between the two opposing surfaces. For example, a reversible seal can be disposed between a door and a frame in an automobile. In this example, the seal represents the active device, while the frame and the door represent the components whose opposing surfaces are used to compress the seal. The automobile represents the assembly.

In one embodiment, the active device generally starts with a first dimension that is larger than the dimension, which is to be used for the intended application. This permits the re-establishment of a snug fit between two components that the active device is disposed between. It also permits resetting a proper spacing or alignment between the components when the active device loses its desired shape due to deformation and wear. The geometry of the active device can therefore be reversibly reset to re-establish alignment and/or spacing by holding the opposing surfaces of the components at the correct alignment and/or spacing and reheating the active device to a temperature greater than a glass transition temperature of the shape memory polymer. This is followed by cooling the active device to a temperature lower than the glass transition temperature for the shape memory polymer. Additionally, gaps between opposing surfaces and active devices that develop during use can be eliminated passively by simply reheating and then cooling the active device.

As noted above, the active devices are disposed between two opposing surfaces of the components of an assembly. In one embodiment, the active device can have a portion of its surface that is adhesively bonded to one of the opposing surfaces of the components. In another embodiment, the active device can have a portion of its surface adhesively bonded to both of the opposing surfaces of the components.

In one embodiment, an amount of greater than or equal to about 20% of the total surface area of the active device is in contact with the opposing surfaces of the components of the assembly. In another embodiment, an amount of greater than or equal to about 40% of the total surface area of the active device is in contact with the opposing surfaces of the components of the assembly. In yet another embodiment, an amount of greater than or equal to about 60% of the total surface area of the active device is in contact with the opposing surfaces of the components of the assembly. In yet another embodiment, an amount of greater than or equal to about 80% of the total surface area of the active device is in contact with the opposing surfaces of the components of the assembly. In yet another embodiment, the entire surface area of the active device is in contact with the opposing surfaces of the components of the assembly.

As noted above, the active devices are generally manufactured from shape memory polymers (SMPs). SMPs generally refer to a group of polymeric materials that demonstrate the ability to return to some previously defined shape when subjected to an appropriate thermal stimulus, e.g., from an expanded foam configuration to a compact foam configuration, from a straight and rigid shape orientation to a soft and flexible orientation, and the like.

The terms compression, compressing, or compressed as used herein refer to the deformation of the active device between two adjacent components, between which the active device is disposed. In one embodiment, the deformation can occur as a result of external forces applied to the opposing surfaces of the components. For example, a shim or spacer can be used as an adjustable stop to set the closed position of a glove box door with respect to the surface of the instrument panel. In another embodiment, the compressive forces can be called into play as a result of the expansion of the seal against the components between which it is disposed.

Several physical properties of SMP's can be altered in response to external changes in temperature. Examples of suitable physical properties that can be varied in response to external changes in temperature include the elastic modulus, hardness, flexibility, vapor permeability, damping, physical dimensions, geometry, index of refraction, and dielectric constant. The elastic modulus (the ratio of the stress in a body to the applied strain) of an SMP can decrease by a factor of up to 30 or higher when heated above the glass transition temperature of the soft segment. Also, the hardness of the SMP changes when the soft segment is at or above its glass transition temperature. When the material is heated to a temperature above the glass transition temperature of the soft segment, the damping ability can be up to five times higher than a similar rubber product. The material can readily recover to its original molded shape following numerous thermal cycles, and can be heated above the melting point of the hard segment and reshaped and cooled to fix a new original shape.

Generally, SMP's are co-polymers comprised of at least two different units which may be described as defining different segments within the co-polymer, each segment contributing differently to the flexural modulus properties and thermal transition temperatures of the material. The term "segment" refers to a sequence of the same or similar monomer or oligomer units that are copolymerized with a different segment to form a polymer. The copolymerization can produce a random or alternating block copolymer, a graft copolymer, star block copolymer, or the like. The segments may be a combination of crystalline or amorphous materials and therefore may be generally classified as a hard segment(s) or a soft segment(s), wherein the hard segment generally has a higher glass transition temperature (Tg) or melting point than the soft segment. Each segment then contributes to the overall flexural modulus properties of the SMP and the thermal transitions thereof. When multiple segments of different compositions or sizes are used, multiple thermal transition temperatures may be observed, wherein the thermal transition temperatures of the copolymer may be approximated as weighted averages of the glass transition temperatures of its comprising segments.

In one embodiment, the first shape and/or dimensions (also referred to as the permanent shape and/or dimensions) of the active device comprising the SMP can be set by molding the device at a temperature higher than the melting point, followed by cooling below the lowest glass transition temperature of the SMP. The first dimensions of the active device are generally larger than the dimensions utilized for the intended application. The second shape and/or dimensions or any other subsequent shape and/or dimensions of the active device is generally obtained by applying a deforming force to the active device at a temperature between the lowest glass transition temperature and the highest glass transition temperature of the SMP. The deforming force is applied because it is desired to realign or to reposition components of the assembly. The second shape or dimension can also be a gap-filling dimension. In this case, the active device upon activation is permitted to expand so as to fill any gap then existing between the opposing surfaces. The active device is then cooled to below the lowest glass transition temperature to fix this new gap-filling dimension.

In practice, the SMP's are alternated between one of at least two shapes such that at least one shape will provide a reduction in the size of one dimension relative to the other shape when an appropriate thermal signal is provided. To set a permanent shape, the SMP must be at about or above its melting point. The SMP's are shaped at this temperature by blow molding, injection molding, vacuum forming, or the like, or shaped with a deforming force followed by cooling to set the permanent shape. The temperature to set the permanent shape is about 40° C. to about 300° C. After a deformation, the permanent shape is regained when the applied force is removed, and the SMP formed device is again brought to or above the highest or last transition temperature of the SMP. The Tg of the SMP can be chosen for a particular application by modifying the structure and composition of the polymer. Transition temperatures of suitable SMPs generally range from about −63° C. to above about 160° C.

The temperature desired for permanent shape recovery can be set at any temperature of about −63° C. and about 160° C., or above. Engineering the composition and structure of the polymer itself can allow for the choice of a particular temperature for a desired application. A preferred temperature for shape recovery is greater than or equal to about −30° C., more preferably greater than or equal to about 20° C., and most preferably a temperature greater than or equal to about 70° C. Also, a preferred temperature for shape recovery is less than or equal to about 250° C., more preferably less than or equal to about 200° C., and most preferably less than or equal to about 180° C.

When the SMP is used in an active device such as a spacing element, the active device has a first dimension (permanent dimension) that is greater than any dimension for which the device will be used in the future. In other words, the first dimension is greater than that needed for any adjustment at any time in the future. During an assembly or alignment process, the active device having a first dimension is heated to a first temperature that is greater than the glass transition temperature of at least one polymeric component of the SMP. In one embodiment, the first temperature is greater than or equal to about the lowest glass transition temperature of the SMP. In another embodiment, the first temperature lies between the lowest glass transition temperature of the SMP and the highest glass transition temperature of the SMP.

As noted above, the lowest glass transition temperature is the glass transition temperature of the soft segment or the lower temperature phase of the SMP. Raising the temperature above the glass temperature of the soft segment lowers the elastic modulus of the SMP. The components to be assembled/aligned are then brought into proximity with the active device and the process of establishing the correct alignment or spacing is performed. In one embodiment, the components to be assembled/aligned are generally used to deform the SMP at a temperature above the glass transition temperature of the soft segment. This alignment or spacing adjustment results in a reduction in the size of at least one dimension of the active device. When the proper alignment has been accomplished, the temperature is reduced below the glass transition temperature of the soft segment (i.e., the lowest glass transition temperature of the SMP). This locks in the deformed dimension/shape (i.e., the second dimension) in the active device, which would thus act to maintain the desired spacing/alignment of the components from that point onwards.

If spacing/alignment is ever needed to be changed, the SMP is once again heated above the glass transition temperature of the soft segment or the lower temperature phase and the components are moved to a new desired spacing/alignment. The SMP active device thus facilitates a fully reversible alignment of machine and vehicle components. The SMP active device also permits multiple resets for alignment and spacing of vehicle components.

Referring now to the FIGURE, a sealing system 100 comprises a seal 10 and a door 20. The seal is manufactured from an SMP and is disposed on a frame 30. The memorized shape of the SMP has at least one dimension whose size is larger than that desired. As may be seen in the FIGURE (*a*), the seal in its memorized shape has a surface that occupies a position indicated by the line 1-1'. In order to align the door 20 to be flush with the seal 10, the seal is heated to a temperature greater than the glass transition temperature of the soft segment of the SMP. The door 20 is then forced towards the frame 30 as indicated by the arrow shown on the door. A compressive force is applied to the seal 10 by the door 20 and the frame 30. When the surface 1-1' occupies the position 2-2', the door is held at that position and the seal is cooled down to a temperature below the glass transition temperature of the soft segment of the SMP. The outer surface of the door 20 will now be aligned with the outer surface of the seal 10.

With the passage of time, repeated opening and closing of the door 20 can result in the seal 10 changing its shape and/or dimensions. In such a case, the surface 2-2' of the seal occupies a new position indicated by 3-3', as may be seen in the FIGURE (*b*). The outer surface of the door 20 is now no longer aligned with the outer surface of the seal 10. In order to return the door 20 to its original position where its outer surface is flush with the outer surface of the seal 10, the seal 10 is once again heated to a temperature greater than the glass transition temperature of the soft segment of the SMP. Upon being heated, the seal 10 will then attempt to arrive at its permanent shape (i.e., the first shape). The door 20 is once again forced against the seal 10 restricting it to occupy the surface 2-2' and thus keeping the outer surface of the door 20 aligned with the outer surface of the seal 10. When the outer surface of the door 20 is aligned with the outer surface of the seal 10, the temperature of the seal is reduced to below the glass transition temperature of the soft segment of the SMP.

This method of adjustment of machine parts and/or automobile surfaces is useful in that it does not involve the replacement of the active device. In one embodiment, a tool can be applied locally to the active device to provide the external stimulus that is desirable for converting the active device from its first dimensions to its second dimensions. The external stimulus either directly or indirectly increases the temperature of the active device to a value greater than or equal to the glass temperature of the soft segment. The increase in temperature may be brought about by conduction, convection or radiation. When the change in temperature is brought about by the use of radiation, a tool that can deliver electromagnetic radiation to the active device to change its temperature can be used. Examples of electromagnetic radiation are microwave radiation, visible light, ultraviolet radiation, infra-red radiation or combinations thereof.

The shape memory polymers used in the active device can be thermoplastics, interpenetrating networks, semi-interpenetrating networks, or mixed networks. The polymers can be a single polymer or a blend of polymers. Polymers can be linear, branched, thermoplastic elastomers with side chains or any kind of dendritic structural elements. In one embodiment the shape memory polymer can be a block copolymer, a graft copolymer, a random copolymer or a blend of a polymer with a copolymer.

The change in the shape and/or dimensions of the active device is brought about by a change in the temperature of the device. The temperature of the device can be changed by the application of an electrical field, radiation such as, for example, microwave radiation, visible light, ultraviolet radiation, infra-red radiation or combinations thereof; thermal conduction or convection, a magnetic field, ultrasonic waves, or the like to the device.

Suitable polymer components to form a shape memory polymer include polyphosphazenes, polyacrylics, polyalkyds, polystyrenes, polyesters, polyaramides, polyamideimides, polyarylates, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like. The polymer used to form the various segments in the SMPs described above are either commercially available or can be synthesized using routine chemistry.

In one embodiment, the SMP may comprise a thermosetting polymer. An exemplary thermosetting shape memory polymer is a copolymer of styrene and a vinyl compound that is not styrene. The thermosetting SMP generally comprises polystyrene in an amount of about 30 weight percent (wt %) to about 95 wt %, the polymerized vinyl compound in an amount of about 5 wt % to about 60 wt % and a crosslinking agent in an amount of about 0.5 wt % to about 5 wt %, wherein the wt %'s are based on the total weight of the thermosetting shape memory polymer.

Exemplary vinyl compounds that may be copolymerized with the polystyrene are vinyl neodecanoate, vinyl benzoate, vinyl propionate, vinyl stearate, methylstyrene, 3-methylstyrene, 4-methylstyrene, vinyl pyridine, 2-vinyl pyridine, 3-vinyl pyridine, 4-vinyl pyridine, vinyl laurate, vinyl butyrate, vinyl acetate, vinyl stearate, vinyl 2-furate, vinyl phenylacetate, vinyl carbazole, 4-vinylbenzyl acetate, 4-vinylbenzoic acid, vinyl methyl sulfone, vinyl octadecyl ether, vinyl isooctyl ether, N-vinyl-2-pyrrolidone, N-vinyl-N-methylacetamide, 1-vinylimidazole, N-vinylformamide, N-vinylcaprolactam, vinyl azolactone, N-vinylurea, 4-(vinyloxy)butyl stearate, 4-(vinyloxy)butyl benzoate, 4-(vinyloxymethyl) cyclohexylmethyl benzoate, methyl acrylate, methyl methacrylate, butyl acrylate, t-butyl acrylate, butyl methacrylate, t-butyl methacrylate, hexyl acrylate, acrylic acid, methacrylic acid, benzyl acrylate, benzyl methacrylate, 2-n-butoxyethyl methacrylate, 2-cyanoethyl acrylate, cyclohexyl acrylate, cyclohexyl methacrylate, decyl acrylate, dicyclopentenyl acrylate, dicyclopentenyloxyethyl acrylate, dicyclopentenyloxyethyl methacrylate, dodecyl acrylate, dodecyl methacrylate, 2-ethoxyethyl methacrylate, 2-ethylhexyl acrylate, ethyl methacrylate, 2-hydroxyethyl acrylate, 2-hydroxyethyl methacrylate, isobornyl acrylate, isobornyl methacrylate, 2-(2-methoxyethoxy)ethyl acrylate, 2-(2-methoxyethoxyl)-ethyl methacrylate, 2-methoxyethyl acrylate, 2-methoxyethyl methacrylate, 2-methoxypropyl acrylate, 2-methoxypropyl methacrylate, octyl methacrylate, 2-phenoxyethyl acrylate, 2-phenoxyethyl methacrylate, phenyl acrylate, 2-phenylethyl acrylate, 2-phenylethyl methacrylate, phenyl methacrylate, propyl acrylate, propyl methacrylate, stearyl acrylate, stearyl methacrylate, 2,4,6-tribromophenyl acrylate, undecyl acrylate, undecyl methacrylate, or the like, or a combination comprising at least one of the foregoing vinyl compounds.

Exemplary crosslinking agents are diallyl fumarate, diallyl diglycol carbonate, allyl methacrylate, diallyl phthalate, diallyl suberate, diallyl tetrabromophthalate, diethylene glycol diacrylate, diethylene glycol dimethacrylate, diethylene glycol divinyl ether, N,N'-dimethacryloylpiperazine, 2,2-dimethylpropanediol dimethacrylate, dipentaerythritol pentaacrylate, dipropylene glycol dimethacrylate, ditrimethylolpropane tetraacrylate, divinyl glycol, divinyl sebacate, glycerol trimethacrylate, 1,5-haxadiene, 1,6-hexanediol diacrylate, 1,6-hexanediol diacrylate, 1,6-hexanediol dimethacrylate, N,N'-methylenebismethacrylamide, 1,9-nonanediol dimethacrylate, pentaerythritol tetraacylate, pentaerythrtol triacrylate, pentaerythritol triallyl ether, 1,5-pentanediol dimethacrylate, poly(propylene glycol) dimethacrylate, tetraethylene glycol dimethacrylate, triethylene glycol diacrylate, triethylene glycol dimethacrylate, triethylene glycol divinyl ether, 1,1,1-trimethylolethane trimethacrylate, 1,1,1-trimethylolpropane diallyl ether, 1,1,1-trimethylolpropane triacrylate, 1,1,1-trimethylolpropane trimethacrylate, tripropylene glycol diacrylate, 1,2,4-trivinylcyclohexane, divinyl benzene, bis(2-methacryloxyethyl) phosphate, 2,2-bis(4-methacryloxyphenyl)propane, 1,3-butanediol diacrylate, 1,4-butanediol diacrylate, 1,3-butanediol dimethacrylate, 1,4-butanediol dimethacrylate, 1,4-butanediol divinyl ether, 1,4-cyclohexanediol dimethacrylate, bis[4-(vinyloxy)butyl]isophthalate, bis[4-(vinyloxymethyl) cyclohexylmethyl]glutarate, bis[-(vinyloxy)butyl]succinate, bis((4-((-vinyloxy)methyl)cyclohexyl)methyl)isophthalate, bis (4-(vinyloxy)butyl) terephthalate, bis[[(4-[vinyloxy)methyl) cyclohexyl]methyl]terephthalate, bis[4-vinyloxy)butyl] adipate, bis[4-(vinyloxy)butyl](methylenedi-1,4-phenylene) biscarbamate, bis[4-(vinyloxy)butyl](4-methyl-1,3-phenylene) biscarbamate, bis[4-(vinyloxy)butyl]1,6-hexanediylbiscarbamate, tris[4-(vinyloxy)butyl]trimellitate, or the like, or a combination comprising at least one of the foregoing crosslinking agents.

The SMP's may be advantageously reinforced with fillers. Suitable fillers may exist in the form of whiskers, needles, rods, tubes, strands, elongated platelets, lamellar platelets, ellipsoids, micro fibers, nanofibers and nanotubes, elongated fullerenes, and the like. Non-limiting examples of suitable fibrous fillers include short inorganic fibers, including processed mineral fibers such as those derived from blends comprising at least one of aluminum silicates, aluminum oxides, magnesium oxides, and calcium sulfate hemihydrate, boron fibers, ceramic fibers such as silicon carbide, and fibers from mixed oxides of aluminum, boron and/or silicon. Also included among fibrous fillers are single crystal fibers or "whiskers" including silicon carbide, alumina, boron carbide, iron, nickel, copper. Fibrous fillers such as glass fibers, basalt fibers, including textile glass fibers and quartz may also be included.

Examples of naturally occurring fibers that may be used in the SMP's are wood flour obtained by pulverizing wood, and fibrous products such as cellulose, cotton, sisal, jute, cloth, hemp cloth, felt, and natural cellulosic fabrics such as Kraft paper, cotton paper and glass fiber containing paper, starch, cork flour, lignin, ground nut shells, corn, rice grain husks and mixtures comprising at least one of the foregoing.

In addition, organic reinforcing fibrous fillers and synthetic reinforcing fibers may be used. This includes organic polymers capable of forming fibers such as polyethylene terephthalate, polybutylene terephthalate and other polyesters, polyarylates, polyethylene, polyvinylalcohol, polytetrafluoroethylene, acrylic resins, high tenacity fibers with high thermal stability including aromatic polyamides, polyaramid fibers, polybenzimidazole, polyimide fibers, polyphenylene sulfide, polyether ether ketone, polyimide, polybenzoxazole, aromatic polyimides or polyetherimides, and the like. Combinations of any of the foregoing fibers may also be used.

Such reinforcing fillers may be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture. Typical cowoven structures include glass fiber-carbon fiber, carbon fiber-aromatic polyimide (aramid) fiber, and aromatic polyimide fiber-glass fiber. Fibrous fillers may be supplied in the form of, for example, rovings, woven fibrous reinforcements, such as 0-90 degree fabrics, non-woven fibrous reinforcements such as continuous strand mat, chopped strand mat, tissues, papers and felts and 3-dimensionally woven reinforcements, performs and braids.

In general, the amount of filler present in the SMP can be up to about 50 wt %, based on the total weight of the SMP and the filler. In an exemplary embodiment, the amount of filler is about 0 to about 20 wt %, based on the total weight of the SMP and the filler.

In one embodiment, the active device is manufactured from an SMP that comprise a continuous or matrix phase that is electrically conducting. In such a case, the continuous or matrix phase of the SMP can be reinforced with electrically conductive fillers. Upon subjecting the active device to an electrical current, the electrically conducting matrix heats up due to resistive heating brought on by the passage of the electrical current. By heating the continuous phase to a temperature greater than the glass transition temperature of the soft segment or the lower temperature phase, the active device can be reset to a new desired position.

Examples of suitable electrically conducting fillers are single wall carbon nanotubes, multiwall carbon nanotubes, vapor grown carbon fibers, carbon black, metallic particles, or the like. The electrically conducting fillers are present in an amount of greater than or equal to about 0.5 wt %, based upon the total weight of the SMP and the conducting filler. In another embodiment, the electrically conducting fillers are present in an amount of greater than or equal to about 1.0 wt %, based upon the total weight of the SMP and the conducting filler. In yet another embodiment, the electrically conducting fillers are present in an amount of greater than or equal to about 2.0 wt %, based upon the total weight of the SMP and the conducting filler. In yet another embodiment, the electrically conducting fillers are present in an amount of greater than or equal to about 5.0 wt %, based upon the total weight of the SMP and the conducting filler.

In another embodiment, the active device may be used in the form of a foam. Both the soft segment and the hard segment of the SMP may be foamed separately if desired. In one embodiment, the foam has a porosity of greater than or equal to 50 volume percent. In another embodiment, the foam has a porosity of greater than or equal to about 70 volume percent. In yet another embodiment, the foam has a porosity of greater than or equal to about 90 volume percent. The foam may be microporous or macroporous. In general when the average pore size is less than or equal to about 10 micrometers, then the foam is referred to as being microporous. Foam having an average pore size of greater than or equal to about 10 micrometers are termed macroporous forms.

In one embodiment, an active device of sufficient thickness to accommodate variations in part geometry and alignment comprises an SMP having segments with the appropriate glass transition temperatures for a given operation. The active device is heated to a temperature greater than the lowest glass transition temperature of the SMP, whereupon its modulus drops by a factor of about 30. The active device is then deformed to occupy a desired space. In occupying the desired space, the active device facilitates a smooth finish for mating components and reduces chatter between such components in an assembly.

When the active device occupies the desired space, it is cooled to a temperature below the lowest glass transition temperature. The cooling facilitates the setting of the active device geometry. If at any time during the life cycle of the assembly it is desired to alter or realign the components, the active device can be reheated. When heated, the active device will also attempt to return to its original molded dimensions. Its modulus will also drop allowing it to be deformed by any stresses created by imposed realignment/repositioning of the components of the assembly. Thus, following reheating, the alignment of the components can be altered, thereby deforming the active device. The heating and deformation of the active device facilitates reestablishment of a snug fit between the components of the assembly. In one embodiment, the active device can be reheated to fill gaps in the assembly without altering the alignment of the components.

In one advantageous embodiment, in one method of employing the active device as a seal or a spacer, the active device is installed during the assembly process. The dimensions and/or shape of the active device can be adjusted multiple times during the assembly process depending upon variations in the dimensions of other components used in the assembly. For example, during the assembly of an automobile, a seal installed between the door of the automobile and the frame may be heated and deformed shortly after the installation of the door to account for variations in the door and the frame. However, upon the assembly of other components onto the frame, additional variations may have to be made to the seal to account for dimensional differences that occur during/due to the assembly process. The seal can be reheated and deformed upon demand to minimize chatter and variation that occurs during/due to the assembly process.

In an alternative embodiment, the seal can be heated only once after the entire assembly is completed in order to accommodate variations in tolerance that occurs during the manufacturing process. The use of SMP's thus permits proper positioning the first time.

The ability to change the seal dimensions during assembly minimizes the possibility of part distortion. Components of the assembly do not have to be force fitted into one another to accommodate dimensional variations that occur during manufacturing. In addition, the ability to heat and reversibly deform the active device during assembly permits reversible position and alignment setting between components of an assembly.

In another advantageous embodiment, the active device can be heated at any time during the life cycle of the assembly to minimize dimensional variations in the active device and to reduce vibrations and chatter in the assembly. As noted above, upon heating above at least the lowest glass transition temperature, the active device returns to its "as molded" shape or as far as it can towards its molded shape until encountering resistive forces/gap boundaries. In its permanent shape, the active device generally occupies its largest dimensions. Thus the active device can be expanded to fill in gaps that occur between components in an assembly at any desirable time. This resettable part alignment at anytime during the life of the vehicle can be advantageously used to eliminate relative movement between parts.

The active devices manufactured from SMP's can have their dimensions and/or shape changed more than 2 times during the life cycle of the assembly. In one embodiment, the active devices can have their dimensions and/or shape changed more than 5 times during the life cycle of the assembly. In another embodiment, the active devices can have their dimensions and/or shape changed more than 10 times during the life cycle of the assembly. In yet another embodiment, the active devices can have their dimensions and/or shape changed more than 100 times during the life cycle of the assembly. In yet another embodiment, the active devices can have their dimensions and/or shape changed more than 500 times during the life cycle of the assembly.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A method of re-dimensioning an active device, such as a shim, seal, spacer, washer, grommet, gasket or the like, comprising shape memory polymer, so as to maintain fixed relative spacing, alignment and/or positioning of assembled parts, said method comprising:
   securing the device relative to a first surface defined by a first part, wherein the device is operative to change at least one physical attribute in response to a thermal activation signal;
   activating the device with a thermal activation signal to substantially decrease its modulus;
   fixedly securing a second surface defined by a second part relative to the first, and cooperatively compressing the device with the first and second surfaces, so as to form an assembly;
   cooling the device to a temperature below the lowest glass transition temperature of the shape memory polymer, after forming the assembly;
   causing the surfaces to relatively displace, so as to form a gap between at least a portion of said first and second surfaces and the device;
   re-activating the device with a second signal when the surfaces are caused to relatively displace, so as to cause the device to reconfigure, and be recompressed by the surfaces, and the gap, to close; and
   re-cooling the device to a temperature below the lowest glass transition temperature of the shape memory polymer, after re-activation.

2. The method of claim 1, wherein the disposing comprises bonding the active device to the first surface with an adhesive.

3. The method of claim 1, wherein the shape memory polymer is a thermoplastic polymer, a thermosetting polymer, or a blend of a thermoplastic polymer with a thermosetting polymer.

4. The method of claim 1, wherein the shape memory polymer is a block copolymer, a graft copolymer, a random copolymer or a blend of a polymer with a copolymer.

5. The method of claim 1, wherein the shape memory polymer comprises an electrically conductive filler.

6. The method of claim 1, wherein the electrically conductive filler is carbon black, single wall carbon nanotubes, multiwall carbon nanotubes, metal particles, vapor grown carbon fibers, or a combination comprising at least one of the foregoing electrically conductive fillers.

7. The method of claim 1, wherein the thermal activation signal comprises conduction, convection or radiation.

8. The method of claim 7, wherein the radiation is infrared radiation, ultraviolet radiation, visible radiation, microwave radiation, or combinations thereof.

9. The method of claim 1, wherein the thermal activation signal is an electrical signal.

10. A method of adjusting an active device comprising a shape memory polymer having a glass transition temperature, and securely disposed between two opposing surfaces defined by first and second interconnected parts, said method comprising:
    heating the active device to a first temperature, so as to activate the device;
    compressing the active device between the two opposing surfaces to a first dimension;
    cooling the active device to a second temperature, wherein the glass transition temperature is between the first and second temperature, so as to set the first dimension;
    causing the surfaces to relatively translate, so as to produce a gap between the device and at least one of the two opposing surfaces;
    reheating the active device to the first temperature;
    reconfiguring the active device and causing the first dimension to change to a second dimension, so as to fill the gap; and
    cooling the active device to the second temperature to set the second dimension.

11. The method of claim 10, wherein the active device is a seal, a spacer, a washer, a grommet, or a gasket.

12. The method of claim 10, wherein the heating and/or reheating of the active device is accomplished through electrical heating.

13. The method of claim 10, wherein the heating and/or reheating of the active device is accomplished by conduction, convection, and/or radiation.

14. A method of adjusting an active device disposed between two opposing surfaces comprising:

heating the active device comprising a shape memory polymer to a first temperature;
expanding the active device to fill a gap between the two opposing surfaces to a first dimension;
cooling the active device to a second temperature;
wherein the glass transition temperature of at least one polymeric component of the shape memory polymer is between the first temperature and the second temperature; and
reheating the active device to the first temperature at a later point in time;
repositioning the opposing surfaces; and
cooling the active device to the second temperature to set a second dimension.

15. The method of claim 14, wherein the shape memory polymer is a thermosetting polymer, a thermoplastic polymer or a blend of a thermoplastic polymer with a thermosetting polymer.

* * * * *